United States Patent [19]

Bolgiano et al.

[11] 4,421,782

[45] Dec. 20, 1983

[54] PROCESS FOR PROVIDING IMPROVED RADIATION-CURABLE SURFACE COVERINGS AND PRODUCTS PRODUCED THEREBY

[75] Inventors: Nicholas C. Bolgiano, East Hempfield Township, Lancaster County; William T. Sigman, Eden Township, Lancaster County, both of Pa.

[73] Assignee: Armstrong World Industries, Inc., Lancaster, Pa.

[21] Appl. No.: 389,164

[22] Filed: Jun. 17, 1982

Related U.S. Application Data

[63] Continuation-in-part of Ser. No. 314,988, Oct. 26, 1981, abandoned.

[51] Int. Cl.$^3$ .............................................. B05D 3/06
[52] U.S. Cl. .................................. 427/53.1; 427/54.1; 427/407.1; 204/159.22; 264/22; 264/171
[58] Field of Search ...................... 427/44, 53.1, 54.1, 427/407.1; 204/159.22; 264/171, 22

[56] References Cited

U.S. PATENT DOCUMENTS

| | | | |
|---|---|---|---|
| 3,455,643 | 7/1969 | Gruber et al. | 427/44 |
| 3,709,738 | 1/1973 | Wetherell | 427/44 |
| 3,924,023 | 12/1975 | Boranian et al. | 427/54.1 |
| 3,935,364 | 1/1976 | Proksch et al. | 427/44 |
| 3,959,521 | 5/1976 | Suetsugi et al. | 427/54.1 |
| 4,016,306 | 4/1977 | Miyagawa et al. | 427/54.1 |
| 4,075,366 | 2/1978 | Packer et al. | 427/44 |

Primary Examiner—John H. Newsome
Attorney, Agent, or Firm—Laird F. Miller

[57] ABSTRACT

The present invention relates to improved flooring materials and to a process for making said materials whereby a first layer on a support which is curable by actinic radiation is coated with a layer of a solution comprising water, acrylic acid, a suitable surfactant and, if desired, organic solvents. Upon irradiating the two layers, a tough, durable surface is formed having characteristics superior to those presently known in the art.

80 Claims, No Drawings

PROCESS FOR PROVIDING IMPROVED RADIATION-CURABLE SURFACE COVERINGS AND PRODUCTS PRODUCED THEREBY

The present application is a continuation-in-part of copending application Ser. No. 314,988, filed Oct. 26, 1981 now abandoned.

The present invention relates to radiation-curable coatings, and more particularly, to radiation-curable coatings which have a scratch resistant and easily cleanable surface.

BACKGROUND OF THE INVENTION

Radiation and moisture curable coatings are well known in the art and are desirable because they provide finishes which tend to be tough and abrasion resistant. Nevertheless, when these surfaces are exposed to wear, particularly as floor coverings, scratches and gouges are created; therefore, much time and effort have been spent by industry to develop materials which will demonstate improved durability and cleanability.

THE PRIOR ART

A variety of references describe UV curable coatings and compositions. For example, U.S. Pat. No. 4,138,299 (Bolgiano) discloses a liquid coating comprising (1) a urethane prepolymer which is essentially —NCO terminated but which is partially capped with a monohydroxy acrylate and (2) ethylenically unsaturated acrylate diluents. The ethylenic functions are photopolymerized and the —NCO groups are moisture cured to give a tough, glossy coating. U.S. Pat. No. 3,959,521 (Tazuke et al.) discloses a process whereby a composition comprising ethylenic unsaturation and free isocyanate is coated on a substrate and irradiated. A resinous top coating comprising ethylenically unsaturated groups is then applied and the surface is again irradiated. U.S. Pat. No. 4,100,318 (McCann et al.) discloses a floor covering comprising at least one organic compound having at least two photopolymerizable ethylenically unsaturated groups per molecule, the coating being essentially solvent free. U.S. Pat. No. 4,171,387 (Fogle et al.) discloses cellulosic substrates coated with a urethane adhesive and a UV curable urethane top coat comprising polyacrylate resin. U.S. Pat. No. 4,180,615 (Bettoli) discloses vinyl flooring having a UV curable top coat comprising an essentially solvent free urethane having at least two photopolymerizable ethylenically unsaturated groups. U.S. Pat. No. 4,188,455 (Howard) discloses unsaturated urethane oligomers which are UV curable in air, the oligomers being derived from at least one active hydrogen-containing compound, at least one polyisocyanate and at least one polyether ester. U.S. Pat. No. 4,216,267 (Lorenz et al.) discloses urethane coating compositions comprising an oligomer of a specified formula, an acrylic UV light absorber and, preferably, a vinyl monomer copolymerizable with the oligomer. U.S. Pat. No. 4,233,425 (Terfertiller et al.) discloses UV or chemically curable addition polymerizable polyethers having pendant ethylenically unsaturated urethane groups. These and other references are directed to UV curable compositions which are useful as flooring materials; nevertheless, the need to develop improved flooring materials still exists.

Accordingly, one objective of the present invention is to provide a process for making coatings which demonstrate superior toughness, are resistant to marring and staining, and which resist abrasion.

Yet another objective of the present invention is to provide a process whereby radiation-curable substrates may be treated to give surfaces having improved cleanability.

Still yet another objective of the present invention is to provide floor coverings having improved durability, resistance to marring and staining, yet having superior cleanability.

These and other advantages of the present invention will become apparent from the detailed description of preferred embodiments which follows.

SUMMARY OF THE INVENTION

The present invention relates to improved flooring materials and to a process for making said materials whereby a substrate which is curable by actinic radiation is treated with a solution comprising water, acrylic acid, a suitable surfactant and, if desired, organic solvents. Upon irradiating the treated substrate, a tough, durable surface is formed having characteristics superior to those presently known in the art.

DETAILED DESCRIPTION OF PREFERRED EMBODIMENTS

In one embodiment, the present invention relates to a process for treating substrates which are curable by exposure to actinic radiation, said process comprising the steps of preparing a solution comprising water, from about 0.1 to about 75 percent by weight of acrylic acid and from about 0.01 to about 5 percent by weight of a suitable surfactant; depositing a layer of said solution on said substrate; and exposing the treated substrate to actinic radiation.

In a second embodiment, the present invention relates to a coated substrate having improved durability, abrasion resistance and stain resistance, said substrate being obtained by irradiating with actinic radiation a surface which is curable by exposure to said radiation, said surface being coated prior to irradiation with an aqueous solution comprising from about 0.1 to about 75% by weight of acrylic acid and from about 0.01 to about 5% by weight of a suitable surfactant.

Acrylic acid is widely used as a monomer for preparing radiation-curable surface coverings and coatings. However, nowhere in the prior art is it taught or suggested that aqueous solutions comprising acrylic acid and a surfactant can be deposited on a radiation-curable substrate and irradiated, thereby imparting superior wear properties to the treated substrate.

Surprisingly, we have discovered that a radiation-curable substrate may be coated with an aqueous solution comprising acrylic acid, a suitable surfactant and, if desired, organic solvents, and then subjected to actinic radiation to effect curing. The resulting cured surface will possess superior resistance to scratching and gouging, and will demonstrate superior cleanability. Further, the process may be used in certain instances to produce deglossed surface coverings. Thus, such surfaces are remarkably suited for use as floor coverings.

To practice the invention, a radiation-curable substrate is prepared by conventional means. Virtually any radiation-curable substrate may be used. Thus, polyurethanes, polyethers, polyesters, acrylated polyesters, polyester urethane acrylics, and the like which are curable by exposure to actinic radiation will demonstrate improved wear characteristics and cleanability when treated according to the present invention. In addition, ene-thiol systems are also amenable to such treatment. These systems are well known in the art and comprise compounds such as those disclosed in U.S. Pat. No. 4,056,548. The aforementioned substrates may be treated while on an intermediate support surface or when in place on a finished product. For example, a UV-curable urethane wear layer for a flooring structure may be prepared and treated while supported on transfer sheeting, or it may be treated when in place on a floor matrix itself, such as a polyvinyl chloride floor matrix.

Furthermore, the substrate may comprise oligomers and other reactive diluents, alone or in combination. Examples of such materials are ethyl acrylate, propyl acrylate, isopropyl acrylate, butyl acrylate, t-butyl acrylate, 2-ethylhexyl acrylate, isodecyl acrylate, dicyclopentenyl acrylate, 2-phenoxyethyl acrylate, N,N-dimethylaminoethyl acrylate, ethyl methacrylate, propyl methacrylate, isopropyl methacrylate, butyl methacrylate, t-butyl methacrylate, 2-ethylhexyl methacrylate, isodecyl methacrylate, dicyclopentenyl methacrylate, 2-phenoxyethyl methacrylate, N,N-dimethylaminoethyl methacrylate, acrylic and methacrylic acid esters of lactic acid and stearic acid, neopentyldiol diacrylate, ethylene glycol diacrylate, propylene glycol diacrylate, diethylene glycol diacrylate, 1,6-hexanediol diacrylate, ethylene glycol dimethacrylate, propylene glycol dimethacrylate, butylene glycol dimethacrylate, trimethylolpropane triacrylate, trimethylolpropane trimethacrylate, pentaerythritol di-, tri-, and tetraacrylate and mixtures thereof, pentaerythritol di-, tri-, and tetramethacrylate and mixtures thereof, acrylated or methacrylated fatty acids such as linseed oil or soybean oil, acrylamide, methacrylamide, N-methyl acrylamide, N-ethyl acrylamide, N-propyl acrylamide and the like, N-methyl methacrylamide, N-ethyl methacrylamide N-propyl methacrylamide and the like, N,N-dimethyl acrylamide, N,N-diethyl acrylamide and the like, N,N-dimethyl methacrylamide, N,N-diethyl methacrylamide and the like, acrylic acid, methacrylic acid, 2-hydroxyethyl acrylate, 2-hydroxyethyl methacrylate, glycidyl acrylate, glycidyl methacrylate, allyl acrylate, allyl methacrylate, N-isobutoxy acrylamide, N-methylol acrylamide, vinyl acetate, N-vinylpyrrolidone N-vinylimidazole, vinylpyridine, N-vinylpiperidone, and others.

The aqueous acrylic acid solution will comprise from about 0.1 to about 75 percent by weight of acrylic acid and from about 0.01 to about 5 percent by weight of a suitable surfactant. Preferably, the solution will comprise from about 1 to about 50 percent by weight of acrylic acid and from about 0.01 to about 2 percent by weight of surfactant, and more preferably, from about 1 to about 15 percent by weight of acrylic acid and from about 0.1 to about 1 percent by weight of surfactant.

Any suitable surfactant can be used, the only requirement being that it be compatible with the aqueous acrylic acid solution and that it be suitable to wet the surface of the radiation-curable substrate. Superior results have been obtained with a series of non-ionic alkylphenoxyl polyoxyethylene ethanol surfactants sold by GAF Corporation under the "Igepal" trademark. In particular Igepal CO-610, which is a polyethylene oxide derivative of nonylphenol, has given especially satisfactory results with UV curable urethane wear layers when used at a level of 0.5 percent by weight in aqueous solution with 10 percent by weight of acrylic acid. However, other surfactants such as silicone surfactants, e.g. Dow Corning DC-193, which is polyethylene glycol siloxane, will also give satisfactory results.

The aqueous solution may be applied to the substrate by virtually any conventional means. For example, dip coating, flow coating, curtain coating and the like, all of which are well known in the coating industry, will give satisfactory results.

The uniqueness of the present invention becomes apparent when the aberrations obtained by modifying the present process are considered. For example, if the acrylic acid or the surfactant are excluded from the aqueous solution, generally inferior surface coverings are obtained. Similarly, if the acrylic acid or the surfactant are placed in the substrate instead of in the aqueous phase, a similar result is obtained. From this it is apparent that both components must be present in the aqueous phase to obtain superior results. Nevertheless, inclusion of these ingredients both in the aqueous phase and in the substrate will not give adverse results.

The aqueous coating solutions may also comprise solvents and other components such as comonomers which will polymerize with acrylic acid and/or other cross-linkable compounds present in the solution or in the subtrate. For example, the higher-molecular-weight surfactants of the Igepal series, e.g., Igepal CO-990, tend not to wet the surface of the substrate; however, by adding a water miscible organic solvent, such as isopropyl alcohol, which acts as a leveling agent and a wettability enhancer, wetting can be increased such that suitable results are obtained. Similarly, comonomers such as acrylamide, 2-hydroxyethyl acrylate, vinyl acetate, methylol acrylamide, methacrylic acid, potassium acrylate, zinc acrylate, ethoxy ethoxyethyl acrylate, methacrylamido trimethylammonium chloride, dimethylaminoethyl acrylate, tetrahydrofurfuryl acrylate and the like, may be incorporated, as may viscosity control agents, pigments, antifoam agents and flow agents. In addition, because the invention is operable over a wide pH range, agents may also be added to adjust the pH to a desired level.

Photoinitiators may also be included in the aqueous phase, although their presence is not necessary to achieve the superior results obtainable according to the present invention.

Although surfaces produced according to the present invention have shown improved durability and stain resistance, in some instances they have also shown a tendency to be somewhat slippery when wet. Depending upon the intended use, such a characteristic can be undesirable. Surprisingly, however, we have discovered that such slipperiness may be avoided or reduced by including in the aqueous phase one or more water soluble or partially water soluble diacrylate or triacrylate esters of a polyfunctional alcohol. More suprisingly, the inclusion of these di- or tri-acrylate esters increases the resistance to staining of the resulting surface. These materials, which are referred to herein as multifunctional acrylate esters, have given improved surface properties when included in the aqueous phase at levels of from about 0.5 to about 25 percent by weight, but preferably at levels of from about 1 to about 5 percent by weight. Examples of representative mulifunctioal acrylate esters are tetraethylene glycol diacrylate, diethylene glycol diacrylate, ethylene glycol diacrylate, triethylene glycol diacrylate, glycerol diacrylate, pentaerythritol diacrylate and pentaerythritol triacrylate.

The following examples are provided to illustrate but not to limit the scope of the present invention.

EXAMPLE I

The following reactants were charged into a stirred, dry air-purged reactor.

| Components | Weight (Grams) |
|---|---|
| 4,4'-Diisocyanato dicyclohexylmethane | 4508.2 |
| Ionol (antioxidant) | 10.3 |
| 2-Ethylhexyl acrylate | 3332.4 |
| Dibutyltin dilaurate | 20.6 |
| 1,6-Hexanediol diacrylate | 2222.3 |

The mixture was heated to 130° F. and 1401.3 grams of 2-hydroxyethyl acrylate was metered into the reactor at a rate which did not allow the temperature to exceed 130° F. After one hour the following polyesters were charged to the reaction mixture cooled to 120° F.

| Polyester | Grams |
|---|---|
| Triol (Hooker F2039-180). Reaction product of 1 mole glycerol, 3 moles of a 7/3 mixture of adipic acid and isophthalic acid, and 3 moles 1,6-hexanediol; MW 960; Hydroxyl No. 175 | 3640.2 |
| Diol (Union Carbide PCP 0200). A polycaprolactone diol having a MW of 540 and a Hydroxyl No. of 207 | 3413.8 |

There was a small exotherm after which the reaction mixture was stirred at 140° F. for 4 hours. At the end of this period, infrared data showed the absence of isocyanate. The reaction mixture was cooled to 90° F. and the product (Product A) was placed in a Heresite lined drum.

Based on 100 parts by weight of Product A, 2.0% by weight of benzophenone photoinitiator was added together with 0.1% by weight of polyethylene glycol siloxane (Dow Corning DC-193). The coating thus formed had a viscosity of approximately 12,000 centipoises at room temperature and was comprised of 33.6% reactive diluents and 66.4% acrylate-capped urethane prepolymer.

A vinyl flooring tile was coated using a 3-mil Bird blade applicator and the coated tile was passed under two in-line 200-watt-per-inch medium-pressure mercury lamps at a speed of about 10 feet per minute (3 joules/cm$^2$ energy dose as determined by an International Light light meter) to cure the coating by photopolymerizing the ethylenically unsaturated components of the coating formulation. The coating on the tile was tack free, hard and glossy; however, the coating was less than desirable as a durable, tough clear coat for consumer application because it underwent excessive scratching and soiling under simulated wear conditions using a rotating abrasive wheel.

EXAMPLE II

To 100 parts of Product A were added 2 grams of benzophenone and 0.1 gram of DC-193. The coating was applied to vinyl flooring tile using a Bird blade applicator and, before the 3-mil, wet, uncured film was cured by ultraviolet light, it was overcoated with an aqueous solution of acrylic acid containing a nonionic surfactant. The composition of the aqueous overcoat was the following:

| Component | Weight (Grams) |
|---|---|
| Water | 90.0 |
| Acrylic Acid | 10.0 |
| Igepal CO-610 | 0.5 |

The overcoat was applied by immersing the coated tile in the aqueous solution for about one second. The aqueous-over-nonaqueous (wet-on-wet) coated tile was immediately UV cured as described in Example I, washed with water to remove excess aqueous coating and air-dried to give a hard, tough, durable coating which had excellent properties as an abrasion resistant wear coating for flooring. The coating was particularly desirable as a floor coating because it had low soil pickup and was easier to clean than the product described in Example I.

An examination of the surface of the film prepared by curing the wet-on-wet film showed by Fourier Transform Infrared (FTIR) spectroscopy that the surface of the cured film contained an appreciable amount of acrylic acid component in the cross-linked film whereas the under surface of the film showed no evidence that acrylic acid monomer units were contained in the polymer matrix. Although Applicants do not wish to be bound by any theory of operability, it is believed that the acrylic acid diffused into the surface of the nonaqueous layer and copolymerized with the polymerizable components therein. It is particularly surprising and unexpected that such a pronounced surface modification was obtained in the presence of water and in the absence of any photoinitiator in the aqueous phase.

EXAMPLES III-VI

Product A was formulated with dimethylaminoethyl acrylate and photoinitiators according to the following experiments.

| | Examples | | | |
|---|---|---|---|---|
| | Weight of Components (Grams) | | | |
| Components | III | IV | V | VI |
| Product A (from Example I) | 100.0 | 100.0 | 100.0 | 100.0 |
| N,N—Dimethylaminoethyl acrylate | 2.0 | 4.0 | 6.0 | 8.0 |
| Benzophenone | 2.0 | 2.0 | 2.0 | 2.0 |
| 2,2-Dimethoxyphenylacetophenone (Irgacure 651) | 1.0 | 1.0 | 1.0 | 1.0 |
| DC-193 | 0.1 | 0.1 | 0.1 | 0.1 |

The non-aqueous compositions were coated on vinyl tile using a 3-mil Bird blade and, before being cured with ultraviolet light, they were overcoated by dipping in an aqueous solution consisting of 90 grams of water, 10 grams of acrylic acid and 0.5 gram of Igepal CO-610. The samples were then exposed to ultraviolet light as described in Example I and were then washed with water and air dried. The resultant coatings were hard, tough, and abrasion resistant. The coatings in a simulated foot traffic test showed low soiling and were especially easy to clean compared to a control prepared according to Example I.

EXAMPLES VII-IX

The following three examples demonstrate the use of zinc acrylate as a water soluble comonomer with acrylic acid for coating Product A containing 2% by weight of benzophenone, 1% by weight of Irgacure 651 and 0.1% by weight of DC-193. Three-mil drawdowns of the formulated non-aqueous coatings before curing were flow coated wet-on-wet with the following aqueous compositions.

| | Examples | | |
|---|---|---|---|
| | Weight of Components (Grams) | | |
| Components | VII | VIII | IX |
| Water | 81 | 72 | 45 |
| Zinc acrylate (10% in water) | 10 | 20 | 50 |
| Acrylic acid | 9 | 8 | 5 |
| Igepal CO-610 | 0.5 | 0.5 | 0.5 |

The coated samples were immediately cured by ultraviolet light as described in Example I. Evaluation of the cured coatings showed that each was hard, glossy, scratch resistant and had excellent cleanability performance with a mild detergent. The coatings were superior to the cured sample described in Example I and can be categorized as superior low maintenance coatings for flooring.

EXAMPLES X-XIII

To demonstrate the versatility of the wet-on-wet coating process using aqueous on non-aqueous coating phases, the following aqueous compositions containing acrylic acid and comonomers were prepared. Three-mil drawdowns of the non-aqueous uncured composition of Example I on vinyl tile were flow coated with the aqueous compositions of Examples X-XIII, and the coated tiles were immediately passed under medium pressure mercury lamps as described in Example I. After washing with water and air drying, the coatings were examined for soiling and scratching as described in Example I using a rotating abrasive wheel. All four of the samples showed better performance than the coating in Example I and were much easier to clean after the soiling test than the product from Example I.

| | Examples | | | |
|---|---|---|---|---|
| | Weight of Components (Grams) | | | |
| Components | X | XI | XII | XIII |
| Water | 85 | 90 | 90 | 90 |
| Acrylic acid | 10 | 9 | 8 | 5 |
| Methacrylamidotrimethylammonium chloride | 5 | — | — | — |
| N—Vinylpyrrolidone | — | 1 | 2 | 5 |
| Igepal CO-610 | 0.5 | 0.5 | 0.5 | 0.5 |

EXAMPLES XIV-XV

The following compositions demonstrate the use of flow aids and viscosity modifiers as useful additives to an aqueous solution of acrylic acid for coating non-aqueous ultraviolet light cured coatings.

| | Examples | |
|---|---|---|
| | Weight of Components (Grams) | |
| Components | XIV | XV |
| Water | 90 | 90 |
| Acrylic acid | 10 | 10 |

-continued

| | Examples | |
|---|---|---|
| | Weight of Components (Grams) | |
| Components | XIV | XV |
| Polyvinylpyrrolidone (MW = 10,000) | 1 | — |
| Acrysol A-5 (Rohm and Haas polyacrylic acid - 25% in water) | — | 4 |
| Igepal CO-610 | 0.5 | 0.5 |

The aqueous compositions of Examples XIV and XV were applied to the UV-curable coating composition of Example I by flow coating and then cured by ultraviolet light according to the procedure of Example I. The products obtained were hard, glossy, and abrasion resistant and were much superior in performance as an abrasion resistant, low maintenance coating for flooring when compared to a cured film from Example I.

EXAMPLES XVI-XIX

Product A was formulated as follows to give Product B.

| Components | Weight (Grams) |
|---|---|
| Product A | 92.5 |
| Acrylic acid | 7.5 |
| Benzophenone | 2.0 |
| Irgacure 651 | 1.0 |
| DC-193 | 0.1 |

Product B was used to coat vinyl tile with a 3-mil wet film using a Bird blade applicator and the coated tiles were then curtain or flow coated with each of the following solution.

| | Examples | | | |
|---|---|---|---|---|
| | Weight of Components (Grams) | | | |
| Components | XVI | XVII | XVIII | XIX |
| Water | 99 | 98 | 95 | 90 |
| Acrylic acid | 1 | 2 | 5 | 10 |
| Igepal CO-610 | 0.5 | 0.5 | 0.5 | 0.5 |

The wet-on-wet coatings were cured according to Example I, washed with water and wiped dry to give coatings which were evaluated for performance. Each of the above examples on Product B was superior in resisting soil and abrasion and in ease of cleanability compared to either cured films of Product A or Product B in a simulated floor-wear, soil and abrasion test. The soiled samples were also easier to clean than those of Products A and B.

EXAMPLES XX-XXII

To 100 parts of Product A were added 2 grams of benzophenone, 1.0 gram of Irgacure 651 and 0.1 gram of DC-193. This product (Product C) was coated on vinyl tile using a 3-mil Bird blade applicator and before the tiles were cured, each was overcoated in the wet-on-wet process with aqueous solutions containing different concentrations of acrylic acid (Examples XX, XXI, XXII).

| | Examples Weight of Components (Grams) | | |
|---|---|---|---|
| Components | XX | XXI | XXII |
| Water | 99 | 98 | 95 |
| Acrylic acid | 1 | 2 | 5 |
| Igepal CO-610 | 0.5 | 0.5 | 0.5 |

The wet-on-wet biphase coatings were cured as outlined in Example I and all samples after curing were hard, glossy, and scratch resistant. The cured films in a simulated wear test showed a significant improvement in performance compared to cured Product C alone. This was surprising in view of the fact that no photoinitiator was used in compounding the aqueous coating and also in view of the small amount of acrylic acid in the aqueous phase which was required to produce such a dramatic improvement in soiling and abrasion resistance. All three samples were much easier to clean using a mild detergent than the cured control (Product C).

EXAMPLE XXIII

This example demonstrates that the wet-on-wet coating process of the present invention also enhances the floor wear performance of other ultraviolet light-curable coatings. The preparation and use of an acrylated polyester (Product E) is described rather than an acrylated polyester urethane as used in the previous examples. The acrylated polyester was prepared in two steps, Step 1 being a polyesterification reaction and Step 2 being acrylation of the hydroxy-terminated polyester.

Step 1. The polyester (Product D) was prepared by charging into a 5-liter, 4-neck, round-bottom flask, the following ingredients:

| Components | Weight (Grams) |
|---|---|
| Isophthalic acid | 973 |
| Phthalic anhydride | 868 |
| 1,6-Hexanediol | 1148 |
| Neopentyl glycol | 427 |
| Cyclohexane dimethanol (CHDM-R90 Eastman Chem. Prod.) | 94 |
| Dibutyltin bis-lauryl mercaptide | 3.2 |
| Foamkill 8R | 1 drop |

The flask was equipped with a metal stirrer, nitrogen inlet, thermometer and an upright steam heated column packed with glass helices. The pot temperature was slowly raised to 428° F. The nitrogen flow was maintained at 1.25 standard cubic feet per hour (SCFH) over the duration of the reaction and the water by-product was removed until the acid number was less than 1. Analysis of Product D gave a hydroxyl number of 84.2 and an acid number of 0.3.

Step 2. The acrylated polyester (Product E) was prepared by charging the following ingredients into a 2-liter, 4-neck, round-bottom flask.

| Components | Weight (Grams) |
|---|---|
| Polyester (Product D) | 1041.0 |
| Toluene | 237.0 |
| Acrylic acid | 144.0 |
| Hydroquinone | 0.116 |
| p-Methoxyphenol | 0.231 |
| Sulfuric acid | 2.84 |

The temperature of the reaction mixture was raised to 221° F. with a nitrogen flow of 1.25 SCFH. A total of 21.7 ml of water was removed using a Barrett trap and a water cooled condenser. The acrylated polyester was then cooled to room temperature and the trap and condenser were replaced with a distilling head. The temperature was raised until the mixture was stirrable and 1.33 grams of magnesium oxide and 11.6 grams of butyl benzyl phthalate were added. The temperature was raised to 221° F. and a vacuum (50 mm Hg) was applied; 170 ml of organic distillate was removed. The final acrylated polyester (Product E) had a viscosity of 112,600 cps, an acid number of 19.56 and a hydroxyl number of 10.6.

The acrylated polyester was formulated as follows:

| Components | Weight (Grams) |
|---|---|
| Acrylated polyester (Product E) | 100.0 |
| Irgacure 651 | 1.0 |
| Benzophenone | 2.0 |

A 3-ml draw down of formulated Product E was UV-cured on a tile substrate as described in Example I. It was subjected to simulated floor traffic conditions but performed poorly, showing excessive scratching and soiling and poor cleanability. When the same coating on tile before curing was dip coated with a solution containing 90 grams of water, 10 grams of acrylic acid and 0.5 gram of Igepal CO-610, and then cured in the same manner, the resultant coating had excellent cleanability, low soiling characteristics and was more resistant to scratching than the cured acrylated polyester (Product E) that had not been overcoated with aqueous acrylic acid prior to curing.

EXAMPLE XXIV

This example demonstrates the applicability of this invention to still yet another type of ultraviolet light curable coating; namely, an unsaturated polyester prepared using fumaric acid in conjunction with a diacrylate diluent and photoinitiators. To prepare the unsaturated polyester the following ingredients were charged into a 3-liter, 4-neck round-bottom flask.

| Components | Weight (Grams) |
|---|---|
| Phthalic anhydride | 1036 |
| Fumaric acid | 348 |
| Diethylene glycol | 503 |
| Ethylene glycol | 372 |
| Hydroquinone | 0.14 |

The flask was equipped with a metal stirrer, nitrogen inlet, thermometer and an upright steam condenser packed with glass helices. The pot temperature was slowly raised to 419° F. being careful not to let the gases leaving the column exceed 212° F. The nitrogen flow was increased from 0.2 SCFH to 1.0 SCFH over the duration of the reaction. When the majority of the water was removed and the head temperature began to fall, samples were removed to measure the acid number. This was followed until the acid number declined to 19.4. The hydroxyl number was found to be 29.1 indicating an equivalent weight of 1157. The pot temperature was lowered to 266° F. and 296 grams of polyester was mixed with 148 grams of tetraethyleneglycol diacrylate and 0.022 gram of hydroquinone to give a product (Product F) with a viscosity of 77,000 cps at room temperature. Product F was then formulated as follows:

| Components | Weight of Components (Grams) | |
| --- | --- | --- |
|  | a | b |
| Product F | 92.5 | 92.5 |
| Acrylic acid | 7.5 | — |
| Benzophenone | 2.0 | 2.0 |
| Irgacure 651 | 1.0 | 1.0 |

Three-mil drawdowns of these coatings were made on vinyl tile and the wet coatings were overcoated by curtain coating with an aqueous solution comprising 90 grams of water, 10 grams of acrylic acid and 0.5 grams of Igepal CO-610 surfactant. The wet-on-wet coatings were exposed to ultraviolet light according to Example I and the cured films were washed with water and wiped dry. The products on evaluation using an abrasion and soiling tester as described in Example I showed excellent performance compared to cured coatings XXIVa and XXIVb which had not been overcoated with an aqueous solution of acrylic acid before curing. Coatings XXIVa and XXIVb alone soiled and scratched badly and were difficult to clean using a mild detergent whereas the treated coatings showed a much improved ease of cleanability.

EXAMPLE XXV

This example shows a composition comprising an ultraviolet light-curable ene-thiol system.

| Components | Weight (Grams) |
| --- | --- |
| Trimethylolpropane tris(betamercaptopropionate) | 54.6 |
| Triallylisocyanurate | 32.8 |
| Benzophenone | 1.7 |
| Irgacure 651 | 0.8 |

The composition was applied to vinyl tile using a 3-mil Bird blade and was rapidly cured using a medium-pressure mercury lamp, giving a tack-free film with high gloss. The performance of the coating in a simulated foot traffic test using an abrasive wheel showed that the properties of the coating were less than desirable as a no-wax coating because of excessive scratching and soiling.

EXAMPLES XXVI-XXVIII

These examples demonstrate the applicability of this invention to the ene-thiol system illustrated in Example XXV. The ene-thiol system on vinyl flooring before curing was overcoated with the following aqueous solutions.

| Components | Examples Weight of Components (Grams) | | |
| --- | --- | --- | --- |
|  | XXVI | XXVII | XXVIII |
| Water | 90 | 90 | 80 |
| Acrylic acid | 10 | 10 | 10 |
| Igepal CO-610 | 0.5 | — | 0.5 |
| DC-193 | — | 0.5 | — |
| Ethanol | — | — | 10 |

Flow coating was used to apply the aqueous solutions, after which the biphase systems were immediately exposed to ultraviolet light as outlined in Example I, and then washed and dried. Each sample was compared to the product from Example XXV in respect to abrasion resistance gloss, soiling and cleanability with mild detergent. The results showed that the overall performance of the cured films prepared using the aqueous systems on the non-aqueous ene-thiol system was significantly improved. The cured biphase coatings were especially outstanding in regard to improved soil resistance and cleanability.

EXAMPLE XXIX

The composition of Example I was ultraviolet light cured on vinyl flooring tile as described in Example I. After curing, a solution comprising 90 grams of water, 10 grams of acrylic acid and 0.5 gram of Igepal CO-610 was applied by flow coating to the cured coating. The resultant composition was immediately processed with ultraviolet light as described in Example I. After washing with water and drying, the product was evaluated for soiling and scratching using a simulated floor abrasion tester. The results showed that although the coating was hard, glossy and tack-free, it was undesirable as a durable, tough clear coat for consumer application because it underwent excessive soiling and scratching under the simulated test conditions.

EXAMPLE XXX

The composition of Example I was applied to vinyl flooring using a Brid blade applicator and the 3-mil film was exposed to the energy output of a single 200-watt medium-pressure mercury lamp in such a manner that the coating received an energy dose of 0.31 joules/cm$^2$. This dosage was achieved by using a line speed of 40 fpm and a one-eighth inch thick window glass filter between the sample and the lamp. The resultant tacky surface was then flow coated with a solution containing 90 grams of water, 10 grams of acrylic acid and 0.5 gram of Igepal CO-610. The coated sample was immediately passed through the radiation output of two 200-watt medium-pressure mercury lamps at 15 fpm, the coating receiving an energy dose of 3.0 joules/cm$^2$. An evaluation of the product showed that it was hard and glossy and, further, that it demonstrated less soiling and scratching after testing with the floor wear tester than the products of Example I and XXIX. The product was also much easier to clean.

EXAMPLE XXXI

To 100 parts of Product A (Example I) was added 1 gram of Irgacure 651 photoinitiator and 0.1 gram of DC-193. The coating was applied to vinyl flooring tile using a 3-mil Bird blade and the film was exposed to 0.31 joules/cm$^2$ of energy output from medium-pressure mercury lamps. The resultant tacky film was flow coated with a solution comprising 90 grams of water, 10 grams of acrylic acid and 0.5 gram of Igepal CO-610. The coated surface was immediately exposed to 3.0 joules/cm$^2$ of energy output from medium-pressure mercury lamps. The product was washed with water and dried. The hard, tack-free glossy coating was found to have better soil resistance, less scratching and easier cleanability than the products of Examples I and XXIX.

EXAMPLES XXXII-XXXIII

Examples
Product A (Example I) was formulated as follows:

| Components | Weight of Components (Grams) | |
|---|---|---|
| | XXXII | XXXIII |
| Product A | 100 | 100 |
| Benzophenone | 2 | 2 |
| N—Methyldiethanolamine | 3 | — |
| N,N—Dimethylaminoethanol | — | 3 |
| DC-193 | 0.1 | 0.1 |

The compositions were applied to vinyl flooring using a 3-mil Bird blade and the uncured films were flow coated with a solution containing 90 grams of water, 10 grams of acrylic acid and 0.5 gram of Igepal CO-610. The aqueous over non-aqueous (wet-on-wet) coated tile coatings were immediately cured as described in Example I, washed with water to remove excess aqueous coating and dried. Both samples gave hard, tough, durable coatings which had excellent soil resistance and ease of cleanability. The coatings were also low in gloss, a particularly advantageous property for some applications.

EXAMPLE XXXIV

This example illustrates the improved surface characteristics which may be obtained if a multifunctional acrylate ester is included in the aqueous phase. A solution comprising the following ingredients was prepared:

| Ingredient | Grams |
|---|---|
| Water | 90.0 |
| Acrylic acid | 7.0 |
| Triethylene glycol diacrylate | 2.0 |
| Igepal CO-610 | 0.5 |

This solution was coated onto the 3-mil, wet, uncured film described in Example I and the coated film was immediately cured with ultraviolet light as described therein. The wear performance of the resulting surface was comparable to that of the surface obtained in Example II; however, this surface was less susceptible to staining by ordinary household stains such as mercurochrome, mustard, shoe polish and the like. In addition, the surface of the cured coating also appeared to show improved slip resistance when compared to a sample prepared according to Example II.

The present invention is not restricted solely to the descriptions and illustrations provided above but encompasses all modifications envisaged by the following claims.

We claim:
1. A process for preparing a composite layer material comprising the steps of:

depositing a first layer of a composition which is curable by exposure to actinic radiation on a support, preparing a solution comprising water, from about 0.1 to about 75% by weight of acrylic acid and from about 0.01 to about 5% by weight of a suitable surfactant which is compatible with said acrylic acid and which enables said solution to wet said first layer, depositing a layer of said solution on said first layer, and exposing the pair of layers to actinic radiation.

2. The process as set forth in claim 1 hereof wherein said solution comprises from about 1 to about 50% by weight of acrylic acid and from about 0.01 to about 2% by weight of surfactant.

3. The process as set forth in claim 1 hereof wherein said solution comprises from about 1 to about 15% by weight of acrylic acid and from about 0.1 to about 1% by weight of surfactant.

4. The process as set forth in claims 1, 2 or 3 hereof wherein said solution comprises a water miscible organic solvent which is suitable to act as a leveling agent and wettability enhancer.

5. The process as set forth in claims 1, 2, or 3 hereof wherein said first layer comprises a polyurethane.

6. The process as set forth in claims 1, 2, or 3 thereof wherein said first layer comprises a polyester.

7. The process as set forth in claims 1, 2, or 3 hereof wherein said first layer comprises an acrylated polyester.

8. The process as set forth in claims 1, 2, or 3 hereof wherein said first layer comprises a polyether.

9. The process as set forth in claims 1, 2, or 3 hereof wherein said first layer comprises a polyester urethane acrylic.

10. The process as set forth in claims 1, 2, or 3 hereof wherein said first layer comprises an ene-thiol system.

11. The process as set forth in claims 1, 2, or 3 hereof wherein said surfactant is a non-ionic surfactant.

12. The process as set forth in claim 11 hereof wherein said surfactant is an alkylphenoxy polyoxyethylene ethanol.

13. The process as set forth in claim 12 hereof wherein said surfactant is a nonylphenoxy polyoxyethylene ethanol.

14. The process as set forth in claim 11 hereof wherein said surfactant is a silicone surfactant.

15. The process as set forth in claim 14 hereof wherein said surfactant is polyethylene glycol siloxane.

16. The process as set forth in claims 1, 2 or 3 hereof wherein said solution comprises a comonomer.

17. The process as set forth in claims 1, 2 or 3 hereof wherein said solution comprises at least one multifunctional acrylate ester.

18. The process as set forth in claim 17 hereof wherein said solution comprises from about 0.5 to about 25% by weight of said ester.

19. The process as set forth in claim 17 hereof wherein said solution comprises from about 1 to about 5% by weight of said ester.

20. The process as set forth in claim 17 hereof wherein said ester is selected from the group consisting of tetraethylene glycol diacrylate, diethylene glycol diacrylate, ethylene glycol diacrylate, triethylene glycol diacrylate, glycerol diacrylate, pentaerythritol diacrylate and pentaerythritol triacrylate.

21. The process as set forth in claim 20 hereof wherein said solution comprises from about 0.5 to about 25% by weight of said ester.

22. The process as set forth in claim 20 hereof wherein said solution comprises from about 1 to about 5% by weight of said ester.

23. The process as set forth in claim 4 hereof wherein said first layer comprises a polyurethane.

24. The process as set forth in claim 4 thereof wherein said first layer comprises a polyester.

25. The process as set forth in claim 4 hereof wherein said first layer comprises an acrylated polyester.

26. The process as set forth in claim 4 hereof wherein said first layer comprises a polyether.

27. The process as set forth in claim 4 hereof wherein said first layer comprises a polyester urethane acrylic.

28. The process as set forth in claim 4 hereof wherein said first layer comprises an ene-thiol system.

29. The process as set forth in claim 4 hereof wherein said surfactant is a non-ionic surfactant.

30. The process as set forth in claim 29 hereof wherein said surfactant is an alkylphenoxy polyoxyethylene ethanol.

31. The process as set forth in claim 30 hereof wherein said surfactant is a nonylphenoxy polyoxyethylene ethanol.

32. The process as set forth in claim 29 hereof wherein said surfactant is a silicone surfactant.

33. The process as set forth in claim 32 hereof wherein said surfactant is polyethylene glycol siloxane.

34. The process as set forth in claim 4 hereof wherein said solution comprises a comonomer.

35. The process as set forth in claim 4 hereof wherein said solution comprises at least one multifunctional acrylate ester.

36. The process as set forth in claim 35 hereof wherein said solution comprises from about 0.5 to about 25% by weight of said ester.

37. The process as set forth in claim 35 hereof wherein said solution comprises from about 1 to about 5% by weight of said ester.

38. The process as set forth in claim 35 hereof wherein said ester is selected from the group consisting of tetraethylene glycol diacrylate, diethylene glycol diacrylate, ethylene glycol diacrylate, triethylene glycol diacrylate, glycerol diacrylate, pentaerythritol diacrylate and pentaerythritol triacrylate.

39. The process as set forth in claim 38 hereof wherein said solution comprises from about 0.5 to about 25% by weight of said ester.

40. The process as set forth in claim 38 hereof wherein said solution comprises from about 1 to about 5% by weight of said ester.

41. A composite layer material having improved durability, abrasion resistance, and stain resistance, said material being obtained by irradiating with actinic radiation a first uncured layer which is curable by exposure to said radiation, said layer being coated prior to irradiation with a layer of an aqueous solution comprising from about 0.1 to about 75% by weight of acrylic acid and from about 0.01 to about 5% by weight of a suitable surfactant which is compatible with said acrylic acid and which enables said solution to wet said first uncured layer.

42. The invention as set forth in claim 41 hereof wherein said solution comprises from about 1 to about 50% by weight of acrylic acid and from about 0.01 to about 2% by weight of surfactant.

43. The invention as set forth in claim 41 hereof wherein said solution comprises from about 1 to about 15% by weight of acrylic acid and from about 0.1 to about 1% by weight of surfactant.

44. The process as set forth in claims 41, 42 or 43 hereof wherein said solution comprises a water miscible organic solvent which is suitable to act as a leveling agent and wettability enhancer.

45. The invention as set forth in claims 41, 42 or 43 hereof wherein said first layer comprises a polyurethane.

46. The invention as set forth in claims 41, 42 or 43 hereof wherein said first layer comprises a polyester.

47. The invention as set forth in claims 41, 42 or 43 hereof wherein said first layer comprises an acrylated polyester.

48. The invention as set forth in claims 41, 42 or 43 hereof wherein said first layer comprises a polyether.

49. The invention as set forth in claims 41, 42 or 43 hereof wherein said first layer comprises a polyester urethane acrylic.

50. The invention as set forth in claims 41, 42 or 43 hereof wherein said first layer comprises an ene-thiol system.

51. The invention as set forth in claims 41, 42 or 43 hereof wherein said surfactant is a non-ionic surfactant.

52. The invention as set forth in claim 51 hereof wherein said surfactant is an alkylphenoxy polyoxyethylene ethanol.

53. The invention as set forth in claim 52 hereof wherein said surfactant is a nonylphenoxy polyoxyethylene ethanol.

54. The invention as set forth in claim 51 hereof wherein said surfactant is a silicone surfactant.

55. The invention as set forth in claim 54 hereof wherein said surfactant is polyethylene glycol siloxane.

56. The invention as set forth in claims 41, 42 or 43 hereof wherein said solution comprises a comonomer.

57. The invention as set forth in claims 41, 42 or 43 hereof wherein said solution comprises at least one multifunctional acrylate ester.

58. The invention as set forth in claim 57 hereof wherein said solution comprises from about 0.5 to about 25% by weight of said ester.

59. The invention as set forth in claim 57 hereof wherein said solution comprises from about 1 to about 5% by weight of said ester.

60. The invention as set forth in claim 57 hereof wherein said ester is selected from the group consisting of tetraethylene glycol diacrylate, diethylene glycol diacrylate, ethylene glycol diacrylate, triethylene glycol diacrylate, glycerol diacrylate, pentaerythritol diacrylate and pentaerythritol triacrylate.

61. The invention as set forth in claim 60 hereof wherein said solution comprises from about 0.5 to about 25% by weight of said ester.

62. The invention as set forth in claim 60 hereof wherein said solution comprises from about 1 to about 5% by weight of said ester.

63. The invention as set forth in claim 44 hereof wherein said first layer comprises a polyurethane.

64. The invention as set forth in claim 44 hereof wherein said first layer comprises a polyester.

65. The invention as set forth in claim 44 hereof wherein said first layer comprises an acrylated polyester.

66. The invention as set forth in claim 44 hereof wherein said first layer comprises a polyether.

67. The invention as set forth in claim 44 hereof wherein said first layer comprises a polyester urethane acrylic.

68. The invention as set forth in claim 44 hereof wherein said first layer comprises an ene-thiol system.

69. The invention as set forth in claim 44 hereof wherein said surfactant is a non-ionic surfactant.

70. The invention as set forth in claim 69 hereof wherein said surfactant is an alkylphenoxy polyoxyethylene ethanol.

71. The invention as set forth in claim 70 hereof wherein said surfactant is a nonylphenoxy polyoxyethylene ethanol.

72. The invention as set forth in claim 69 hereof wherein said surfactant is a silicone surfactant.

73. The invention as set forth in claim 72 hereof wherein said surfactant is polyethylene glycol siloxane.

74. The invention as set forth in claim 44 hereof wherein said solution comprises a comonomer.

75. The invention as set forth in claim 44 hereof wherein said solution comprises at least one multifunctional acrylate ester.

76. The invention as set forth in claim 75 hereof wherein said solution comprises from about 0.5 to about 25% by weight of said ester.

77. The invention as set forth in claim 75 hereof wherein said solution comprises from about 1 to about 5% by weight of said ester.

78. The invention as set forth in claim 75 hereof wherein said ester is selected from the group consisting of tetraethylene glycol diacrylate, diethylene glycol diacrylate, ethylene glycol diacrylate, triethylene glycol diacrylate, glycerol diacrylate, pentaerythritol diacrylate and pentaerythritol triacrylate.

79. The invention as set forth in claim 78 hereof wherein said solution comprises from about 0.5 to about 25% by weight of said ester.

80. The invention as set forth in claim 78 hereof wherein said solution comprises from about 1 to about 5% by weight of said ester.

* * * * *

UNITED STATES PATENT AND TRADEMARK OFFICE
CERTIFICATE OF CORRECTION

PATENT NO. : 4,421,782
DATED : December 20, 1983
INVENTOR(S) : Nicholas C. Bolgiano et al.

It is certified that error appears in the above-identified patent and that said Letters Patent are hereby corrected as shown below:

In the Abstract, lines 3 and 4 should be corrected to read --whereby a first layer which is curable by actinic radiation, on a support, is coated--.

In the Specification, in column 4, line 56, the word "suprisingly" should read --surprisingly--, and in column 12, line 44, the word "Brid" should read --Bird--.

In the Claims, claim 41 at column 15, lines 57 and 63, the words "uncured" should be deleted such that each line reads --first layer--.

Signed and Sealed this

Thirteenth Day of March 1984

[SEAL]

Attest:

GERALD J. MOSSINGHOFF

Attesting Officer    Commissioner of Patents and Trademarks